United States Patent
Borthakur et al.

(10) Patent No.: US 7,702,634 B1
(45) Date of Patent: Apr. 20, 2010

(54) METHOD AND APPARATUS TO SUPPORT MULTI-NODE DIRECT WRITE ACCESS TO A FILE MANAGED BY A SINGLE NODE FILE SYSTEM

(75) Inventors: Dhrubajyoti Borthakur, San Jose, CA (US); Sridhara Lanka, San Jose, CA (US)

(73) Assignee: Symantec Operating Corporation, Cupertino, CA (US)

(*) Notice: Subject to any disclaimer, the term of this patent is extended or adjusted under 35 U.S.C. 154(b) by 2038 days.

(21) Appl. No.: 10/195,679

(22) Filed: Jul. 15, 2002

(51) Int. Cl.
*G06F 17/30* (2006.01)

(52) U.S. Cl. .................. 707/10; 707/200

(58) Field of Classification Search .............. 707/10, 707/2, 4, 200; 709/201, 238
See application file for complete search history.

(56) References Cited

U.S. PATENT DOCUMENTS

| | | | | |
|---|---|---|---|---|
| 5,706,516 A | * | 1/1998 | Chang et al. | 719/314 |
| 5,764,977 A | * | 6/1998 | Oulid-Aissa et al. | 707/10 |
| 5,835,757 A | * | 11/1998 | Oulid-Aissa et al. | 707/10 |
| 6,029,168 A | * | 2/2000 | Frey | 707/10 |
| 6,101,499 A | * | 8/2000 | Ford et al. | 707/10 |
| 6,115,713 A | * | 9/2000 | Pascucci et al. | 707/10 |

* cited by examiner

*Primary Examiner*—Jean M Corrielus
(74) *Attorney, Agent, or Firm*—Campbell Stephenson LLP

(57) ABSTRACT

Disclosed is a method and apparatus for supporting direct write access from many nodes of a multi-mode network to a file managed by a single node file system. The network includes first and second nodes coupled to each other via a first communication link, and a peripheral data storage device coupled to the first and second nodes via a second communication link. In one embodiment, the method includes the first node receiving data. The first node transmits a first message to the second node via the first communication link in response to the first node receiving the data. A software module such as a single node file system, executing on the second node, allocates storage memory of the peripheral data storage device for the data received by the first node in response to the second node receiving the first message. The first node writes the data to the allocated storage memory via the second communication link such that the data is written to the allocated storage memory without the data first transmitting through the first communication link.

13 Claims, 5 Drawing Sheets

METHOD AND APPARATUS TO SUPPORT MULTI-NODE DIRECT WRITE ACCESS TO A FILE MANAGED BY A SINGLE NODE FILE SYSTEM

BACKGROUND OF THE INVENTION

FIG. 1 illustrates a data processing system 10 having nodes 12a-12c coupled to a storage area network (SAN). The SAN includes a data storage system 20 and a SAN communication link 24. Data storage system 20 may include one or more distinct memory units, each of which may contain, for example, several magnetic or optical disks for storing data.

Nodes 12a-12c can read or write data to data storage system 20 via SAN communication link 24. Nodes 12a-12c also communicate with each other via local area network (LAN) communication link 26. Node 12a is a server computer system while nodes 12b and 12c are client computer systems to server node 12a.

As shown in FIG. 1, server node 12a executes an operating system that includes a single node file system module (hereinafter referred to as single node file system) 30 and a file system driver filter module (hereinafter referred to as filter) 32a. Client nodes 12b and 12c also execute operating systems. The operating systems of client nodes 12b and 12c, however, do not include single node file systems. The operating systems executing on client nodes 12b and 12c include filters 32b and 32c, respectively. Filters 32a-32c can communicate with each other via LAN communication link 26.

Single node file systems create and manage files. Each file is typically created with an address space extending from zero to the size of the file. Single node file systems also allocate storage memory (e.g., storage memory within data storage system 20) to files. While the present invention should not be so limited, single node file systems typically allocate blocks of storage memory to corresponding blocks of file address space. If a storage memory block is allocated to a file address block, then each address in the storage memory block has a corresponding address in the file address block.

In addition to creating files, single node file systems create and manage meta data for each file. Meta data typically includes a file name assigned to the file, the file size, and a table or other similar structure that maps allocated storage memory to the file. Meta data, including memory-mapping tables, is originally created and stored in meta data memory 34a of server node 12a. Operating systems of client nodes 12b and 12c require meta data to access file data. Thus, valid meta data must be copied to meta data memories 34b and 34c before client nodes 12b and 12c can access data in files.

While it is common to say that computer systems write data to files at an address thereof, in reality data is written to and stored in storage memory allocated to the file address by the single node file system. Accordingly, when client node 12b writes data to a file address or file addresses, client node 12b actually writes data to a storage memory allocated to the file address or file addresses. Once storage memory has been allocated to a file address, the allocated storage memory can be used only for storing data designated for the file address unless the single node file system subsequently deallocates the storage memory. It is noted that even though storage memory is allocated, the allocated storage memory need not contain valid data. Moreover, storage memory blocks allocated to a file need not be contiguous or adjacent to each other in data storage system 20. For example, storage memory blocks allocated to a file may be distributed across several optical or magnetic disks of data storage system 20.

Any of nodes 12a-12c is capable of writing data to an address of a particular file in response to a request. However, data can be written to the address only if storage memory of storage system 20 has been allocated to the file address. Because client nodes 12b and 12c do not have single node file systems which can allocate storage memory, the performance of system 10 may degrade in situations where client nodes 12b or 12c receive a request to write data to file addresses which do not have storage memory allocated thereto. To illustrate, FIG. 2 shows operational aspects of client node 12b responding to a request to write data to an exemplary file E. At step 40, client node 12b receives the write request from an application program 36b executing on a computer system (not shown) in data communication with client node 12b. The request includes the data to be written and an address of file E where the data is to be written. From this address and the quantity of data to be written, client node 12b can calculate the address or addresses within file E where the data is to be written. For purposes of explanation, it will be presumed that the write request is an instruction to write data to consecutive addresses in file E. As will be described below, client node 12b can access the memory mapping table for file E to determine whether sufficient storage memory has been allocated for the write request.

After client node 12b receives the write data request, filter 32b first accesses meta data memory 34b to determine whether it includes a valid copy of meta data for file E as shown in step 44. As noted above, before client node 12b can access data in a file, client node 12b must have a valid copy of meta data for the file. If meta data memory 34b does not include a valid copy of the meta data for file E at the time client node 12b receives the write data request, then filter 32b generates a request for a valid copy. In step 46, this request is transmitted to filter 32a via LAN communication link 26.

Filter 32a accesses meta data memory 34a in response to server node 12a receiving the request from filter 32b. Presuming that meta data memory 34a contains valid file E meta data, filter 32a transmits valid file E meta data, including the valid memory mapping table, in a reply to client node 12b via LAN communication link 26, as shown in step 50. In step 52, client node 12b receives the reply from filter 32a, and in response filter 32b overwrites the invalid file E meta data in meta data memory 34b with the newly received valid copy.

With valid meta data for file E in memory 34b, client node 12b can determine whether sufficient storage memory in data storage system 20 has been allocated to complete the write request. More particularly, in step 54, filter 32b accesses the valid copy of memory-mapping table in memory 34b to determine whether storage memory has been allocated to all addresses where data is to be stored.

It is possible that sufficient storage memory has not been allocated to complete the write request. If not, storage memory must be newly allocated to each file E address where data is to be stored. Client node 12b, however, does not include a single node file system that can allocate storage memory. Thus, if filter 32b determines in step 54 that storage memory must be allocated before the write request can be performed, then client node 12b transmits the write request, including the data thereof, to server node 12a via LAN communication link 26.

Server node 12a processes the write data request received from client node 12b. In the process, single node file system 30 allocates the needed storage memory within data storage system 20 to file E. After the new storage memory has been allocated, single node file system 30 accesses file E meta data stored within memory 34a and updates the memory mapping table thereof with the new storage memory allocation. After the meta data for file E has been updated, server node 12*a* writes the data of the write request to allocated storage memory as shown in step 66.

As noted above, the performance of system 10 may degrade in situations where client nodes 12*b* or 12*c* receive requests to write data to file addresses which do not have storage memory previously allocated thereto. More particularly, a frequent transmission of write requests, including the data thereof, from client nodes 12*b* and/or 12*c* to server node 12*a* via LAN communication link 26 may substantially reduce the available bandwidth for transmitting data between the nodes via LAN communication link 26. Moreover, frequent processing of write requests received from client nodes 12*b* and 12*c* may substantially impede server node 12*a*'s ability to process transactions received from, for example, application program 36*a*.

SUMMARY OF THE INVENTION

Disclosed is a method and apparatus for supporting direct write access from many nodes of a multi-mode network to a file managed by a single node file system. The network includes first and second nodes coupled to each other via a first communication link, and a peripheral data storage device coupled to the first and second nodes via a second communication link. In one embodiment, the method includes the first node receiving data. The first node transmits a first message to the second node via the first communication link in response to the first node receiving the data. A software module such as a single node file system, executing on the second node, allocates storage memory of the peripheral data storage device for the data received by the first node in response to the second node receiving the first message. The first node writes the data to the allocated storage memory via the second communication link such that the data is written to the allocated storage memory without the data first transmitting through the first communication link.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 3:
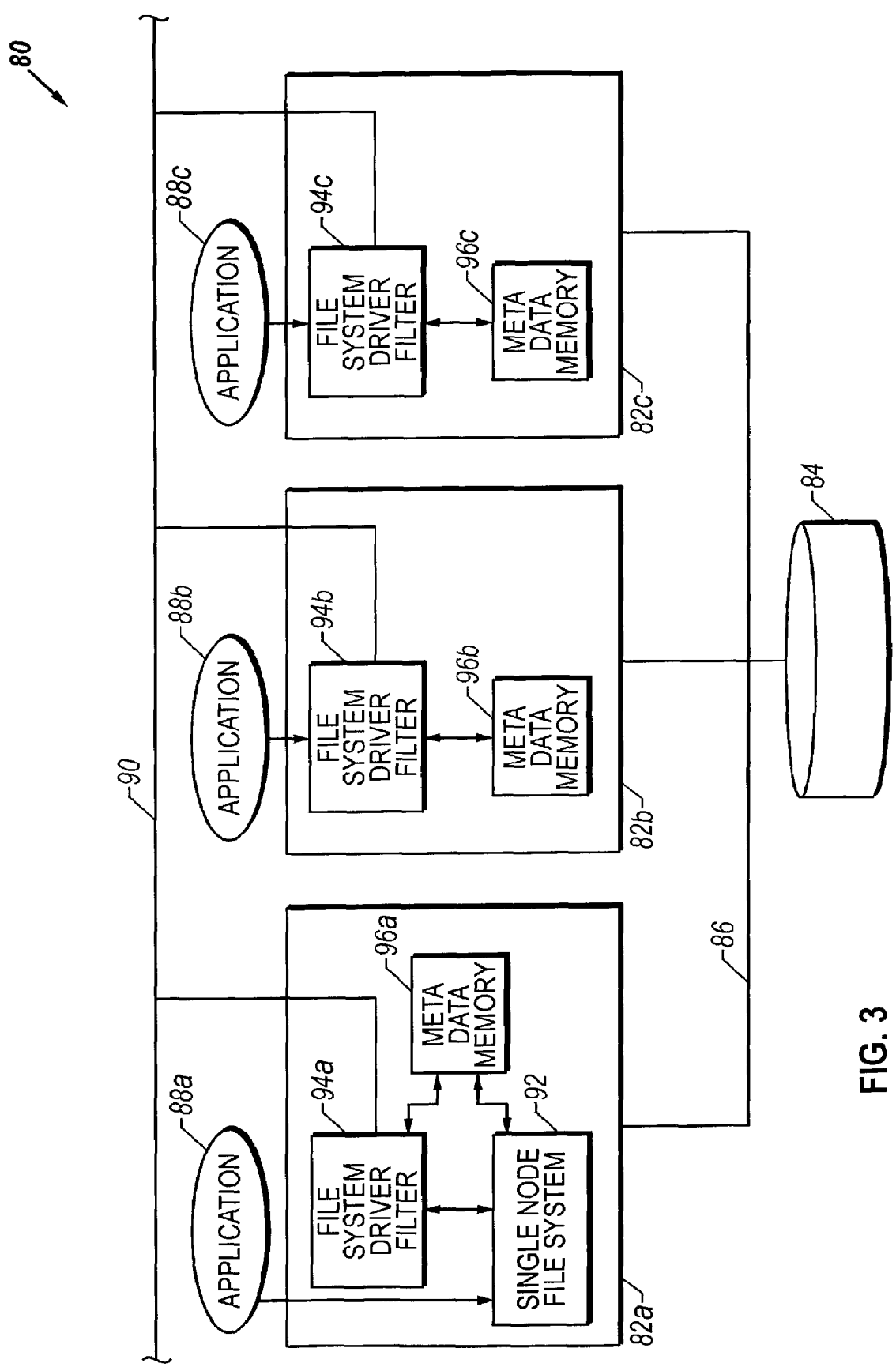
FIG. 3 is a block diagram illustrating a multi-node data processing system employing one embodiment of the present invention.

FIG. 3 illustrates an exemplary data processing system 80 which may employ the present invention. Data processing system 80 includes nodes 82*a*-82*c* each of which is coupled to a SAN. The SAN includes a data storage system 84 coupled to SAN communication link 86. Nodes 82*a*-82*c* may access data in data storage system 84 via SAN communication link 86. Data storage system 84 may include one or more distinct memory units, each of which may contain, for example, several magnetic or optical disks for storing data. It is understood that a traditional SAN may include additional components including a channel switch (not shown) coupled between nodes 82*a*-82*c* and data storage system 84.

For purposes of explanation, the SAN of FIG. 3 will include only SAN communication link 86 and data storage system 84, it being understood that the present invention should not be limited thereto. It is noted that two devices (e.g., nodes 82*a* and 82*b*) may be coupled directly or indirectly. Typically, two devices are indirectly coupled together via a third device. The present invention should not be limited to use in a data processing system having a particular number of nodes.

Nodes 82*a*-82*c* can read or write data to data storage system 84 via SAN communication link 46. Nodes 82*a*-82*c* can also communicate with each other via LAN communication link 90. Nodes 82*a*-82*c* may take form in any one of a number of different types of computer systems. For purposes of explanation, node 82*a* is a server computer system while nodes 82*b* and 82*c* are client computer systems to server node 82*a*. While client nodes 82*b* and 82*c* are presented as clients to server node 82*a*, client nodes 82*b* and 82*c* may be servers for other functions or to other computer systems (not shown) coupled thereto.

Figure 1:
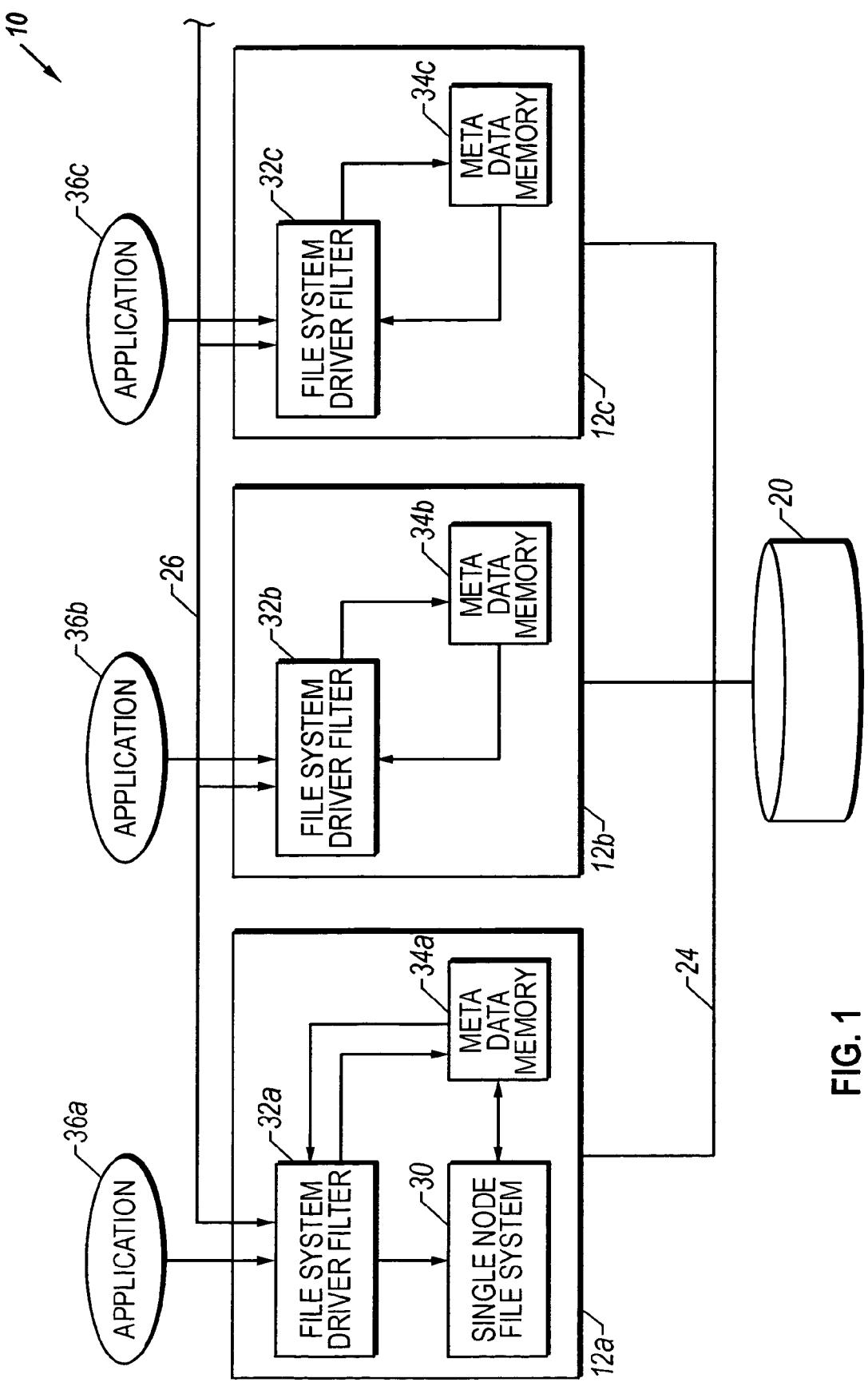
FIG. 1 is a block diagram illustrating a multi-node data processing system.

Each of the nodes 82*a*-82*c* includes an operating system executing on one or more microprocessors. The operating system of server node 82*a* includes a single node file system module (hereinafter single node file system) 92 and a file system driver filter module (hereinafter filter) 94*a*. File system driver filter 94*a* is a software module distinct from the single node file system 92. Nodes 82*b* and 82*c* also execute separate operating systems. The operating systems executing on client nodes 82*b* and 82*c* include filters 94*b* and 94*c*, respectively, but do not include a single node file system. Thus, client nodes 82*b* and 82*c*, like client nodes 12*b* and 12*c* of FIG. 1 do not execute a single node file system and are incapable of creating files or allocating storage memory thereto. Filters 94*a*-94*c* are capable of communicating with each other via LAN communication link 90. Nodes 82*a*-82*c* include meta data memories 96*a*-96*c*, respectively, for storing file meta data. It is noted that file meta data need not be stored in memories contained within nodes 82-82*c*. Rather, file meta data may be stored in memories external to nodes 82*a*-82*c*.

Single node file system 92 creates, manages, or deletes files, each of which is accessible by nodes 82*a*-82*c*. Single node file system 92 creates each file with an address space extending between the first address (i.e., address zero) to the size of the file. Single node file system 92 also allocates storage memory in data storage system 84 to files. Storage memory may be allocated to files in blocks that vary in size.

Single node file system 92 creates and manages meta data for each file. The meta data may include a file name, the file size, and a table or other similar structure that maps storage memory to files at particular addresses or portions of addresses thereof. The term "meta data" should not be limited to include only the foregoing data items. Meta data may also include information indicating whether all or portions of the meta data are valid. For example, meta data may include information indicating whether the entire memory-mapping table is valid and usable, or information indicating whether portions of the memory-mapping table are valid and usable.

Meta data for each file created by single node file system 92 may be stored in each of the meta data memories 96*a*-96*c*. Meta data, including memory-mapping tables, is originally created and stored in meta data memory 96*a* of server node 82*a*. Operating systems of client nodes 82*b* and 82*c* require meta data to access file data. Thus, valid meta data must be copied to meta data memories 96*b* and 96*c* before client nodes 82*b* and 82*c* can access file data.

Nodes 82*a*-82*c* can write data to files created by single node file system 92 in response to, for example, requests received from application programs 88*a*-88*c*, respectively. While nodes 82*a*-82*c* are described herein as capable of writing data to addresses within files, in reality nodes 82*a*-82*c* write data to storage memory allocated to addresses of files. As more fully described below, memory mapping tables are consulted before each write operation to determine whether storage memory has been allocated to the file address where the data is to be written. Once storage memory has been allocated to a file address, the storage memory can be used only for storing data directed to the address unless single node file system 92 subsequently deallocates the storage memory. Storage memory blocks allocated to a file need not be contiguous or adjacent to each other in data storage system 84. Rather, storage memory blocks allocated to a particular file may be distributed across several optical or magnetic disks of data storage 84.

Figure 4A:
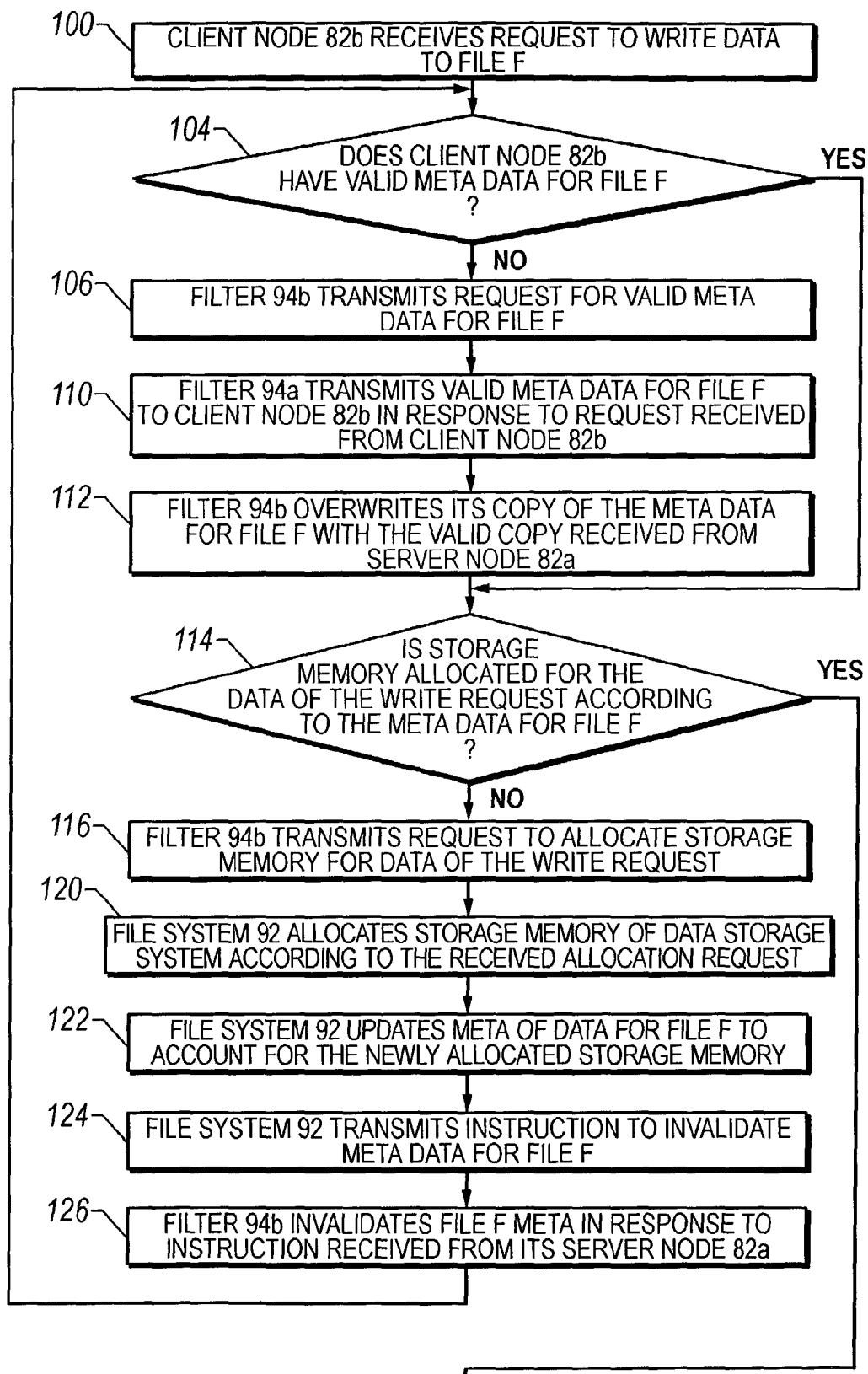
FIG. 4 is a flow chart illustrating operational aspects of the data processing system of FIG. 3 operating in accordance with one embodiment of the present invention.
Figure 4B:
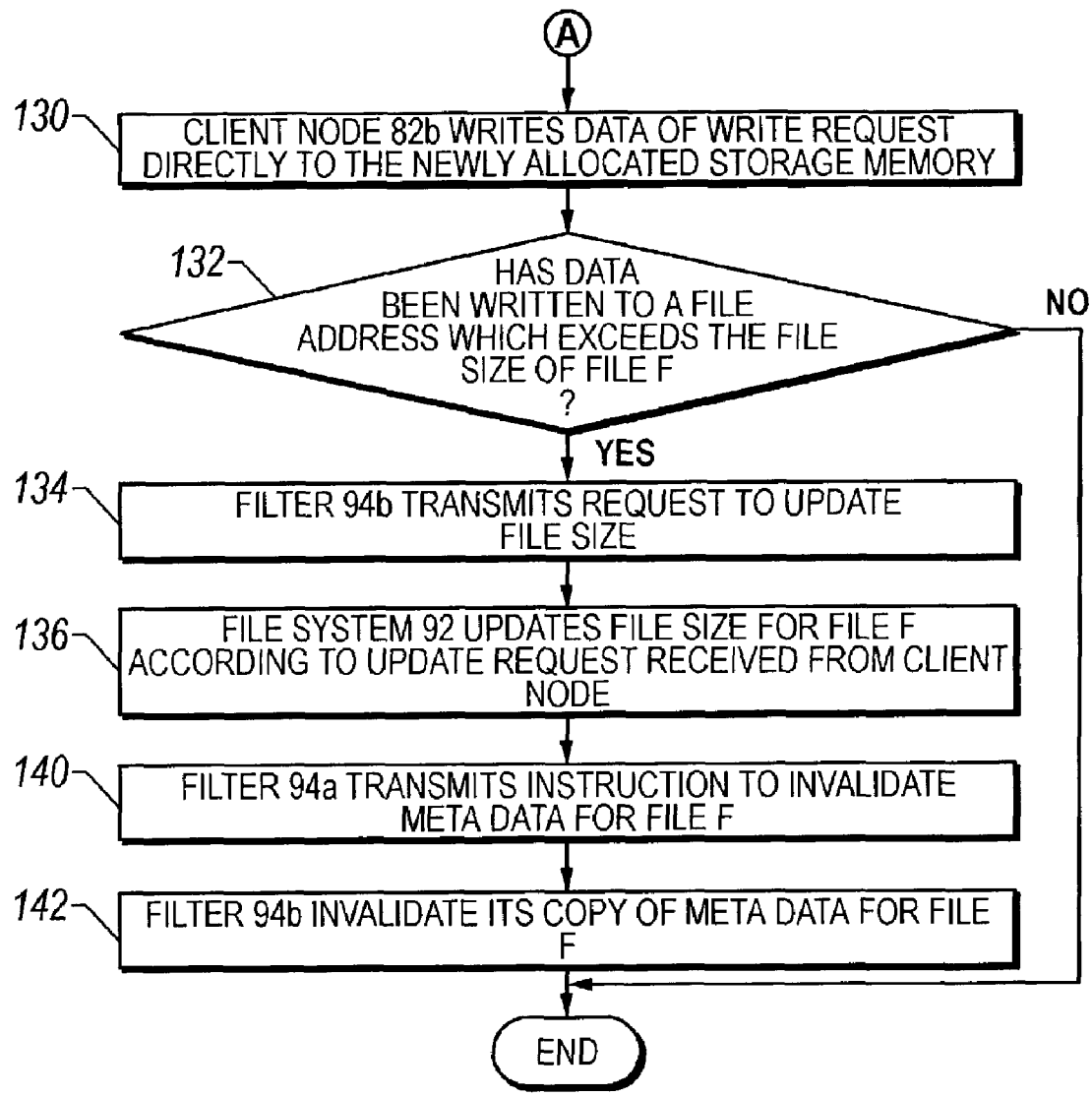

FIG. 4 is a flowchart illustrating aspects of client node 82*b* operating in accordance with one embodiment of the present invention. More particularly, in step 100, client node 82*b* receives a request to write data to a file F from application program 88*b* executing on a computer system (not shown) in data communication with client node 82*b*. This write request includes the data to be written and the address of file F where the data is to be written. For purposes of explanation, it will presumed that the write request is an instruction to write data to a string of addresses of file F beginning at the address identified in the write request, it being understood that the present invention should not be limited thereto. As will be described below, client node 82*b* can access a memory mapping table for file F to determine whether sufficient storage memory has been allocated to complete the write request. As an aside, the write request received by client node 82*b* may be an append write. For an append write, some or all addresses where data is to be stored may exceed or fall outside the file size of file F.

When client node 82*b* receives the write request, the client node may cache the data of the write request. A cache memory for caching data of a write data is not shown within the figures. Before client node 82*b* can write data to file F, client node 82*b* must have access to valid meta data for file F including the memory-mapping table thereof. In one embodiment, filter 94*b* checks meta data memory 96*b* to see if it contains a valid memory mapping table (or valid entries of the memory mapping table corresponding to the addresses where the data is to be stored) and/or the file size for file F. Filter 94*b* generates a request for valid file F meta data if memory 96*b* does not include this data at the time client node 82*b* receives the write data request. The generated request may be for the entire meta data for file F, or in the alternative, for a valid portion of file F meta data (e.g., the memory mapping table or entries of the memory mapping table corresponding to the addresses where data is to be stored in addition to file size). Regardless of whether the generated request is for all file F meta data or a relevant portion thereof, the request is transmitted to server node 82*a* via LAN communication link 90 in step 106.

Filter 94*a* accesses meta data memory 96*a* in response to server node 82*a* receiving the request from client node 82*b* in order to retrieve the needed meta data. Presuming meta data memory 96*a* contains valid file F meta data, filter 94*a* generates and transmits a reply to client node 82*b*'s request. The reply includes file F meta data requested by client node 82*b*. Thus, the reply may simply include a relevant portion of the meta data, i.e., information identifying the storage memory, if any, allocated to the addresses where the data is to be stored.

For purposes of explanation, the transmitted reply includes all file F meta data including the memory mapping table and the file size, it being understood that filter 94*a* need not transmit all file F meta data in the reply. The reply is transmitted to client node 82*b* via LAN communication link 90 as shown in step 110. In step 112, filter 94*b* overwrites the invalid copy of file F meta data in meta data memory 96*b* in response to client node 82*b* receiving the reply from filter 94*a*.

If filter 94*b* determines that meta data memory 96*b* contains valid meta data for file F in step 104, or if the invalid meta data in memory 96*b* is overwritten with valid meta data in step 112, filter 94*b* in step 116 is able to determine whether sufficient storage memory has been allocated to complete the write request. Filter 94*b* uses the file F memory mapping table in memory 96*b* to make this determination. If storage memory has been allocated for each address where data is to be stored, client node 82*b* can write data of the write request directly to data storage system 84 via SAN communication link 86 as shown in step 130. The file size for file F can be used to determine whether the received write request is an append write, as will be more fully described below.

Often storage memory has not been allocated to complete a write request when, for example, client node 82*b* receives the write request. Client node 82*b* cannot write data to a file address unless storage memory has been previously allocated thereto. Client node 82*b*, however, does not include a single node file system for allocating storage memory. If filter 94*b* determines in step 114 that insufficient storage memory has been allocated, then filter 94*b* generates and transmits a request to allocate memory in step 116. This request is transmitted to server node 82*a* via LAN communication link 90.

In one embodiment, the request will contain information identifying file F and the address or addresses thereof for which storage memory needs to be allocated. In the alternative, the request may include the address of file F where the data is to be written and the quantity of data to be written thereto. At any rate, the request should include information necessary to enable single node file system 92 to allocate sufficient storage memory to store the data of the write request received by client node 82*b*.

The request for memory allocation may be forwarded to single node file system 92 after transmission via LAN communication link 90 and filter 94*a*. Alternatively, filter 94*a* may intercept the request and subsequently provide relevant information thereof to single node file system 92. Single node file system 92 eventually allocates storage memory of data storage system 84 in accordance with the request received from client node 82*b* as shown in step 120. It is noted that single node file system 92 must search for and find unallocated storage memory before single node file system 92 can allocate storage memory to file F. In one embodiment, storage memory is allocated by an input/output controller exported by single node file system 92.

In step 122, single node file system 92 updates the memory mapping table for file F in memory 96*a* to account for the newly allocated storage memory. U.S. patent application Ser. No. 10/106,165 entitled "Method and Apparatus to Support Multi-Node Direct Access to File System Data," filed Mar. 26, 2002, and which is incorporated herein by reference in its entirety, describes one method for updating meta data. In one embodiment, single node file system 92 may allocate more storage memory within data storage system 84 than requested by client node 82*b*. This extra allocated memory can be used for future write requests to file F.

After single node file system 92 updates the meta data mapping table, filter 94*a* may generate and transmit an instruction to client node 82*b* (and to client node 82*c*)

instructing it to invalidate all or a portion of its file F meta data as shown in step 124. The instruction is transmitted via LAN communication link 90. In response, as shown in step 126, filter 94b invalidates its copy of meta data for file F or relevant portions thereof stored in memory 96b in response to node 94b receiving the invalidation instruction from filter 94a.

In an alternative embodiment, rather than transmitting an instruction to invalidate meta data for file F, filter 94a may simply transmit the updated meta data for file F for storage in memory 96b. For purposes of explanation, the present invention will be described with respect to filter 94a invalidating the meta data for file F stored within memory 96b via transmission of the invalidation instruction described above.

After the meta data for file F is invalidated within memory 96b, the process shown in FIG. 4 may return to step 104 where filter 94b again determines whether it has valid meta data for file F. Presuming meta data for file F was invalidated in step 126, the process of FIG. 4 proceeds to steps 106-112 whereby valid meta data for file F is requested, provided, and stored within memory 96b. This newly stored meta data for file F should indicate that storage memory has been allocated for all data of the write request. In other words, the memory mapping table for file F should indicate that storage memory has been allocated to complete the write request.

Figure 2:
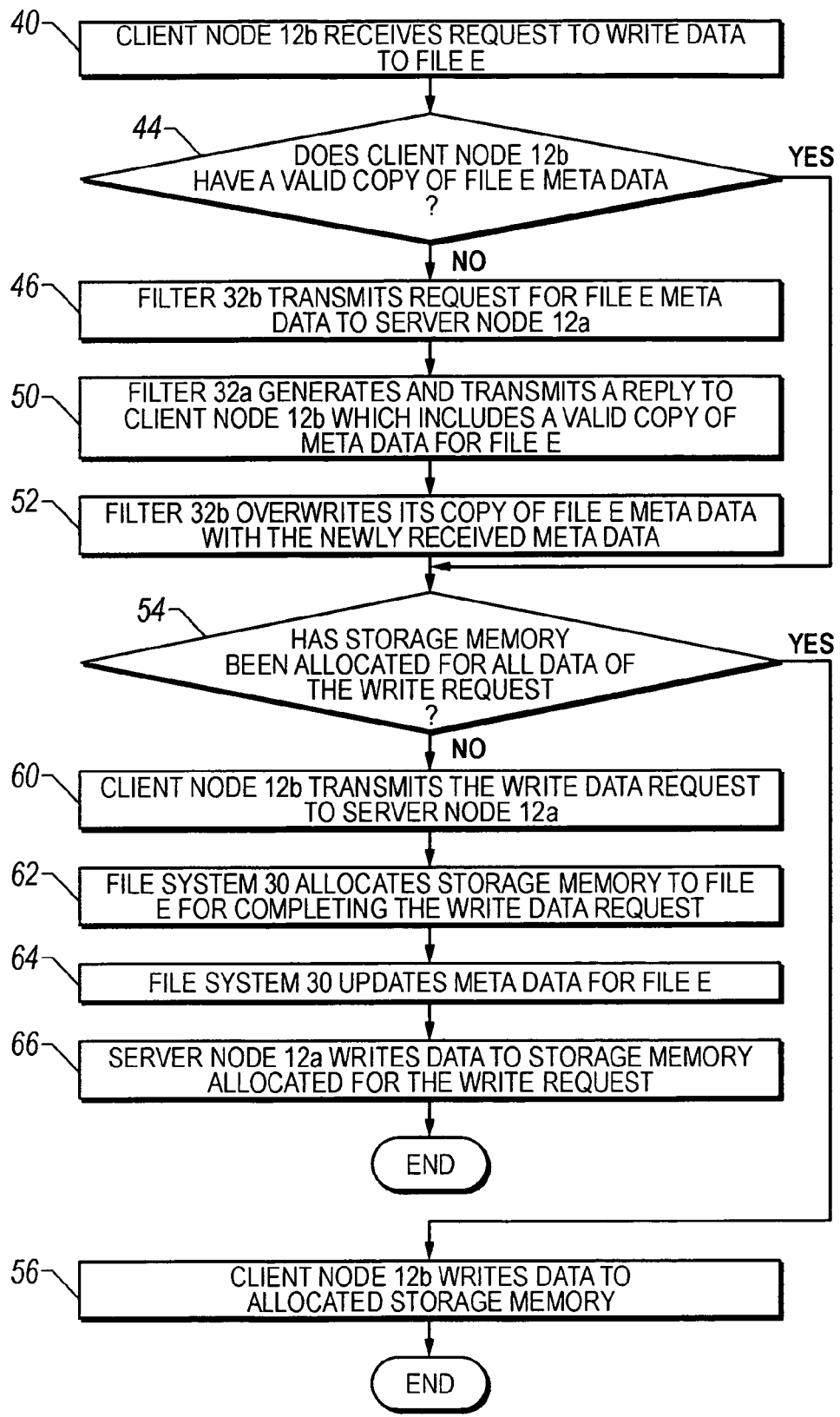
FIG. 2 is a flow chart illustrating operational aspects of the data processing system of FIG. 1.

After completion of steps 106-112, the process proceeds to step 130 whereby the client node 82b writes the data of the write request directly to storage memory allocated thereto. Client node 82b writes the data directly to storage memory allocated in data storage system 84 via SAN communication link 86. In other words, the data is not transmitted to storage system 84 via LAN communication link 90 and/or server node 82a. As a result, when compared to the system and method described in FIGS. 1 and 2, the system and method described in FIGS. 3 and 4 reduces the amount of data transmitted over LAN communication link 90. Moreover, the system and method described in FIGS. 3 and 4 reduces the amount of data processing required of server node 82a when compared to the system and method described in FIGS. 1 and 2.

If client node 82b receives a request to append write data to file F in step 100, the file size for file F should be updated after step 130. Access to file F is limited to addresses between zero and the file size. If the last address of file F where data was written exceeds the file size, the file size should be updated to subsequently enable nodes 82a-82c to access the newly written data. However, only single node file system 92 is capable of updating the file size for file F.

FIG. 4 illustrates one method by which file size for file F can be adjusted after completion of an append write request. More particularly, as shown in FIG. 4, filter 94b accesses meta data for file F in memory 96b in step 132 and determines whether data was written to a file address beyond the current file size. In one embodiment, filter 94b makes this determination by simply comparing the file size of file F with the last address where new data was written.

In step 134, after filter 94b determines that data was written to an address that exceeds the file size for file F, filter 94b generates and transmits a request to update the file size for file F.

This request may include the file name or some information identifying the file and the last address exceeding the file size where data was written. Alternatively, the request may include a quantity of data written to file F, which exceeds the current file size rather than the last address where data was written. For purposes of explanation, it will be presumed that the update file size request includes the last address to which data was written in step 130.

The request is transmitted to server node 82a via LAN communication link 90. Single node file system 92, in response to server node 82a receiving the file size update request, as shown in step 136, updates meta data for file F stored in memory 96a. The meta data may be updated using an input/output controller exported by single node file system 92. This input/output controller may be separate from the input/output controller mentioned above for allocating storage memory. In one embodiment, single node file system 92 simply change the file size of file F to the address contained in the file size update request. In an alternative embodiment, single node file system 92 may change the file size to the last address corresponding to extra storage memory allocated to file R. However, for purposes of explanation, it will be presumed that single node file system 92 changes the file size to the address contained in the request received from node 94b.

After the file size of the meta data has been updated, filter 94a, as shown in step 140, generates an instruction to invalidate either all meta data for file F or the file size thereof. This instruction is transmitted to client nodes 82b and 82c. Filters 94b and 94c invalidate their copies of file F meta data accordingly in response to the instruction received from filter 94a.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed:

1. In a network comprising first and second nodes coupled to each other via a first communication link, and a peripheral data storage device coupled to the first and second nodes via a second communication link, a method comprising:
   the first node receiving data;
   the first node transmitting a first message to the second node via the first communication link in response to the first node receiving the data;
   a single node file system, executing on the second node, allocating storage memory of the peripheral data storage device for the data received by the first node in response to the second node receiving the first message; and
   the first node writing the data to the allocated storage memory via the second communication link;
   wherein the first node writes the data to the allocated storage memory without the data first transmitting through the first communication link.

2. The method of claim 1 further comprising:
   a first software module, executing on the first node, determining whether storage memory of the peripheral data storage device has been previously allocated to store the data; and
   the first node transmitting the first message to the second node in response to the first software module determining that storage memory of the peripheral data storage device has not been previously allocated to store the data.

3. The method of claim 2 wherein the first message comprises information identifying a quantity of storage memory in the peripheral data storage device to be allocated.

4. The method of claim 3 wherein the first message comprises information representing an identification of a file created by the single node file system.

5. The method of claim 4 wherein the first message comprises information representing an address within the file where the data is to be written.

6. The method of claim 2 wherein the first message comprises information representing the quantity of the data.

7. The method of claim 1 wherein the second message comprises information identifying the storage memory allocated in the peripheral data storage device.

8. The method of claim 4 wherein the first message comprises information representing an offset within the file where the data is to be written.

9. The method of claim 2 wherein the first node compares an address of a file where the data is to be written with meta data corresponding to the file in order to determine whether storage memory of the peripheral data storage device has been previously allocated to the address.

10. The method of claim 1 further comprising the single node file system modifying meta data of a file in response to the single node file system allocating storage memory in the peripheral data storage device.

11. The method of claim 10 further comprising the second node transmitting the modified meta data to the first mode via the first communication link before the first node writes the data to the allocated storage memory via the second communication link.

12. The method of claim 3 wherein the amount of storage memory allocated by the single node file system exceeds the quantity contained within the first message.

13. A computer readable memory comprising instructions executable by a first computer system to implement a method in response to the first computer system receiving data, the method comprising:
the first computer system determining whether storage memory of a data storage device has been allocated to store the data; and
the first computer system transmitting a first message to a second computer system via a first communication link in response to the first computer system determining that no storage memory of the data storage device has been allocated to store the data, wherein the first message represents a request for the second computer system to allocate data storage device storage memory for the data;
the first computer system writing the data to a storage memory block of the data storage device via a second communication link in response to the first computer system receiving a second message from the second computer system via the first communication link, wherein the first computer system receives the second message after the first computer system transmits the first message and wherein the first computer system writes the data to the storage memory block without the data first transmitting through the first communication link.

* * * * *